March 18, 1952 W. G. TULLER 2,589,460

ELECTRONIC COMMUTATOR

Filed June 18, 1948 2 SHEETS—SHEET 1

INVENTOR.
WILLIAM G. TULLER
BY Hyman Hurwitz
ATTORNEY

March 18, 1952 W. G. TULLER 2,589,460

ELECTRONIC COMMUTATOR

Filed June 18, 1948 2 SHEETS—SHEET 2

INVENTOR.
WILLIAM G. TULLER
BY Hyman Hurwitz
ATTORNEY

Patented Mar. 18, 1952

2,589,460

UNITED STATES PATENT OFFICE 2,589,460

ELECTRONIC COMMUTATOR

William G. Tuller, Arlington, Va., assignor to Melpar, Inc., Alexandria, Va.

Application June 18, 1948, Serial No. 33,708

22 Claims. (Cl. 315—9)

This invention relates generally to improvements in communication systems and more particularly to systems of time division multiplex communication. Arrangements in accordance with the present invention may be utilized for transmitting telephone, telegraph, facsimile, teleprinter, telemeter or other kinds of signals and enables transmission of any desired numbers of channels, on a single carrier frequency.

The present described embodiment of my invention is based on the transmission of signals in the form of pulses, the pulses corresponding to the different signaling channels being transmitted successively in time so that a group of pulses, comprising a pulse in each of the several channels, is transmitted before a succeeding group of pulses, corresponding likewise with a pulse in each channel, is transmitted. A receiving station is provided, having means for separating the pulses, so that pulses corresponding with those originating in given transmitter channels are passed to appropriate and corresponding reproducing devices, the pulses corresponding to other channels being separated and directed likewise to their corresponding reproducing devices. Synchronizing signals are transmitted between groups of pulses in order to maintain the pulse separating mechanism at the receiver in synchronism with the transmission of groups of pulses.

Considered from another aspect, the present invention involves the transmission of signals on a common carrier wave frequency in the form of a series of modulated pulses, the transmission of pulses corresponding with different channels being transmitted at successively displaced times, so that successive channels are separated by equal time periods, during each of which one pulse of each of the channels is transmitted. Signals and pulses originating in the various channels then, are transmitted sequentially in groups, the pulses originating in any one channel being always correspondingly time positioned in the groups. Means are provided at the receiver for separating the pulses of each group in accordance with the channel in which they originated at the transmitter, and for directing the separated pulses to appropriate reproducing device.

Between each group of pulses is transmitted a synchronizing signal which has the function of maintaining synchronism between the channel separating device at the receiver and the channel establishing device at the transmitter. The synchronizing signal may be distinguished from the intelligence bearing pulses by virtue of any desired distinguishing characteristic, as for example, by virtue of having longer duration, or by virtue of having greater amplitude, than is possessed by the intelligence bearing pulses, in order to enable ready separation of the synchronizing pulse from the intelligence bearing pulses.

Modulation of the pulses at the transmitter may be accomplished in various ways. The pulses may, for example, be modulated in respect to their amplitudes, or in respect to their time durations, or in respect to their time positions within the time divided channels.

Systems for the transmission of time division multiplex signals of the character described above are well known in the art and require no extensive explanation in the present application. Many systems are known, further, for separating pulses at the receiver into their separate channels, and for demodulating the information contained on the pulses in any one channel, abstracting from these pulses the intelligence inherent in the modulation thereof. For the purpose of separating pulses belonging in separate channels at the receiver, there has come into extensive use cathode ray commutator tubes. Such tubes normally contain internally thereof means for generating a cathode ray beam, and a plurality of beam collector electrodes, each of which is connected with a lead extending externally of the tube. The synchronizing voltage is applied to control the traverse of the cathode ray beam across the collector electrodes, the time of traverse of the beam across any particular collector electrode corresponding precisely with the time of one of the channels. Accordingly, at the output leads connected with the various collector electrodes of the commutator tube are established electrical signals corresponding in amplitude and shape with the pulses originally introduced into the separate channels. The commutator tube, accordingly, provides a means for separating time divided multiplex channels.

Commutator tubes known to the prior art have two basic defects. In the first place, they usually require a rotary or circular sweep of a cathode ray beam for their operation, and in the second place, they involve a radically new tube type for each specific application, development of which requires months or years of costly effort. The first objection stems from the fact that the deflection voltages for the tubes are derived from pulsed synchronizing signals, which are translated by means of frequency responsive circuits into a pair of sine waves having each the frequency of the pulse group repetition rate, and phases separated ninety degrees with respect to one another. In consequence, if the group repetition rate at the transmitter is shifted, or changed, the required phase relation between the two deflecting signals which establishes the rotation of the beam, is not maintained. It has been found that circuits can be devised for providing a ninety degree phase shift over only a restricted range of frequencies, at best, and accordingly, the rotation of the cathode ray beam of the commutator tube tends to depart from uniform rotation, introducing inaccuracies of channel separation.

The second difficulty involves purely economic factors. In the present state of the art, wide spread use of cathode ray commutator tubes for purposes for which they might find application is inhibited by these economic factors, and accordingly, the development of readily fabricated commutator tubes presents a prime problem in the art.

It is, accordingly, an object of the present invention to provide a novel cathode ray tube commutator of extremely economical construction.

It is a further object of the present invention to provide a time division multiplex channel separator utilizing a cathode ray tube commutator which is insensitive to variation of group frequency.

It is another and more specific object of the present invention to provide a time division multiplex channel separator comprising a cathode ray commutator tube having collecting electrodes located externally of the tube, and which require no conductive connection with any elements located interiorly of the tube.

It is an ancillary object of the invention to provide means for separating time divided channels and for simultaneously demodulating pulses, in the separate channels, which are modulated in terms of their time positions.

It is still a further ancillary object of the invention to provide a time division multiplex channel separator which inherently demodulates modulated pulses contained in the separate channels.

The present invention provides a channel separator for time division multiplex communication systems generally, the channel separator consisting of a cathode ray tube indicator of conventional structure, associated externally thereof with a plurality of output electrodes for the various channels, as well as with various control circuits for the cathode ray beam generating and control electrodes. I realize that, broadly, the use of cathode ray beam responsive electrodes located externally of the vitreous envelope of a cathode ray tube is not novel, and I am familiar in particular with structures of the general character of that disclosed in U. S. Patent to A. Hund, #1,929,067, issued on application Serial No. 497,457, filed November 22, 1930. While systems of the type disclosed by Hund may find application in the electronic arts, such devices have serious limitations, which render them totally inapplicable for use in the communications art, or for channel separation in time division multiplex systems, for the reason that the responses in the external electrodes, in systems of this character, bear no constant relation to instantaneous values of intensity or density of the electron beam within the cathode ray tube. Accordingly, modulations of the beam intensity or density are not reproduced at the external electrodes, except possibly in extremely rudimentary fashion, and such systems are therefore totally unsuitable for the use in systems wherein wave form must be reproduced with at least some pretense of accuracy.

Hund Patent #1,939,067 relates to a frequency multiplier, the separate external electrodes being swept over by a cathode ray beam, and energy being translated from the beam to the electrodes solely by electro-static induction. It is sufficient to render a device of the Hund type operable for its purpose, as disclosed in the patent, if some sort of response is induced in the collector electrodes by virtue of each passage of the electron beam across the collector electrodes.

If, however, the operation of cathode ray tube devices of the type disclosed in the Hund patent be closely examined, it will be realized that electrons impinging on the internal face of the tube tend to be stored there, and must return to the cathode of the cathode ray tube via an extremely high resistance circuit comprising the glass envelope of the tube, and/or the grid to cathode circuit of an associated amplifier device. Accordingly, after the cathode ray tube device has been in operation for a short time, the internal face of the tube will acquire a considerable negative charge, representing a considerable negative voltage, which will tend to repel the beam of electrons and thereby to distort the latter, and, further, the voltage induced by electro-static induction in the collector electrodes of devices of this character will be a function of the difference between the static voltage of the internal face of the cathode ray tube, as compared with the energy inherent in the electrons impinging upon the face. Since the voltage inherent at the face of the tube is at a given time, a function of the total energy of the electron beam at preceding times, total energy including as a factor the density of the electron beam impinging on the face, increasing the density of the beam, or its intensity, results merely in charging up the face of the tube to a still higher potential and any modulation of the beam which might be attempted for the purpose of transferring intelligence between the beam and the collector electrodes will not actually be transferred undistorted. If the intensity or density of the beam be decreased in accordance with modulating signal, from a previously attained value, the sole result will be a failure of the beam to reach the face of the tube, the latter being at a more negative potential than can be overcome by the energy of the electrons on the beam, while if the intensity or density of the cathode ray beam be increased the face will acquire a correspondingly higher charge, responding to the increase transiently, but will thereafter be the less able to respond to decreases of the energy in the beam. In order for impulses even of relatively slight amplitude to pass to the external collector electrodes, it is necessary then to assume a slight leakage through the glass, and/or through the amplifier tube connected to the collector electrodes, the leakage being sufficient during each traverse of the beam to permit a succeeding slight change in voltage on the external electrode when the beam arrives again at any given point. Output signals will be consequently of minute value in tubes operating at high sweep repetition rate, due to the extremely limited conductivity of the glass envelope of the tube, which establishes a low rate of charge leakage from the face of the tube.

The principle of utilizing external electrodes possesses, however, great advantages in the art, since it permits extremely economical construction of commutator or channel separating tubes. Conventional tubes may be purchased on the open market and modified to provide a commutator tube, by the application thereto of the necessary external electrodes. Commutator tubes to accomplish any desired commutating function may thus be readily fabricated as desired, and the development time normally required for the development of a novel cathode ray tube type adapted to perform assigned commutating functions, amounting to many months, and even years, of research and development, may be completely eliminated.

Briefly described, the commutator tube of my invention is provided internally thereof, on the face which is scanned by the cathode ray beam, with a surface of secondary electron emissive character, the surface being preferably of such type as to emit a plurality of electrons for each electron impinging thereon. I have found in practice that screens of the type known as the P11 fluorescent screen, in the art, and comprising zinc sulphide with silver actuator and nickel quencher, possesses the desired property in exceptionally high degree, although other types of fluorescent screens likewise have the desired properties. The screen, additionally, should possess the property of high resistivity, or high resistance, or, otherwise stated, should be a good insulator, so that charges impressed thereon are bound and do not readily leave the screen. It is important to note that the property of fluorescence is per se unnecessary, the desired property being that of secondary electron emissivity. Since commercial tubes are normally coated with fluorescent phosphor, certain types of which have the requisite electron emissive property in considerable degree, such tubes may be utilized for purposes of convenience.

An electrode is provided in the tube for collecting secondary electrons emitted by the secondary electron emissive screen referred to, and the cathode ray beam is arranged to be normally biassed back beyond cut-off between signals. Accordingly, as the beam is scanned in a plane occupied by electrodes located externally of the scanned face of the tube, no variation of charge on the emissive surface is accomplished, unless the beam is positively modulated. Positive modulation is accomplished in response to the signal pulses in the communication channels, and, by virtue of proper synchronization of the sweep of the beam with the occurrence of groups of channels, the beam is positioned directly in line with one of the external electrodes during each occurrence of a channel and accordingly, during each occurrence of a pulse within the channel. Each information bearing pulse turns on the beam, and causes same to impinge against the scanned face of the tube at a position immediately opposite an external electrode, and the impinging beam causes emission from the emissive surface of secondary electrons, which are collected by the collector electrode, the number of secondaries depending on the total beam current and on its intensity, leaving the emissive surface charged positively at points directly opposite the external electrodes, the magnitude of the positive charges being directly related to the magnitude of the beam modulating pulses.

The maximum potentials of the positively charged areas of the emissive surface are determined by the potential of the collector electrode, since the collector electrode can collect electrons from the screen only so long as the screen remains negative with respect to the potential of the collector electrode.

A further signal recording trace may not successfully be accomplished immediately following a signal recording trace, since the further trace would traverse the positive bound charges on the face of the emissive material, rather than a surface at neutral potential, and accordingly the number of secondaries generated by the beam would not be in proportion to the intensity of the beam, as was the case in response to the first trace across the beam, and the second recording, accordingly, would not correspond with the impressed signals. Furthermore, were any secondary electrons emitted by those spots of positive charge which had already attained maximum value, these would not be collected by the collector electrode since no difference of potential exists between such positively charged spots on the emissive surface and the collector electrode.

It is essential, therefore, that the positively charged spots on the emissive surface be re-established at a potential which is arbitrarily established as standard for the tube, and with respect to which a further positive charge may be introduced in response to a further sweep of the beam of the tube while the latter is signal-modulated. Accordingly, alternate sweeps of the beam of the tubes are accomplished, first with the beam modulated in accordance with signals, and, secondly, with an unmodulated beam which, in fact, has an intensity greater than the maximum intensity due to any possible modulation of the system. Simultaneously, the collector electrode is reduced in potential for the second sweep. Accordingly, during the second sweep the electron beam upon arriving at a positive spot in the emissive surface tends to produce secondary electrons. These electrons, however, are not attracted to the collector electrode, since the latter is now negative with respect to the potentials of the positively charged spots. Accordingly, the emissive surface now acts as an electron collector and the positively charged spots on the emissive surface accumulate negative charges from the electron beam. This accumulation, however, cannot go on indefinitely, since upon arrival of a charged spot at a potential corresponding with that of the collector electrode secondaries are emitted by the spot and attracted to the collector electrode, and the potential of the emissive surface cannot be reduced, accordingly, below the potential of the latter. The second of the two successive sweeps accordingly has the function of painting the emissive surface with a uniform charge corresponding with the reduced voltage applied to the collector electrode. Upon the next or signaling sweep the potential of the collector electrode is again raised in a positive sense, and each modulation of the electron beam now accomplishes the generation of secondaries which are collected by the accelerator electrodes, painting on the electron emissive surface a replica of the signals in the signals channels, or, otherwise described, a picture or record, in terms of bound charges, which corresponds with a plot of the signals provided by the pulses, in respect to both amplitude and/or time position, and/or duration.

It will be realized that 50% of the intelligence in a group of channels will be lost, utilizing the above system, since the commutator tube is operative to separate the channels for 50% of the time, the remaining 50% being utilized in re-conditioning the commutator tube for a succeeding operation. To avoid this idle time, I prefer to utilize two cathode ray tube commutator tubes operating in alternation, one of which accomplishes separation of half the channels in a group of channels, the remaining tube accomplishing separation of the remaining channels of the group, and the two tubes, operating in alternation, accomplishing the separation of all the channels constituting a group of channels, without any lost time.

One undesirable effect which exists in systems of the character above described relates to the electro-static coupling between adjacent external electrodes, which tends to cause adjacent external electrodes to assume a common potential. Such coupling has been found to exist primarily externally of the tube, rather than by reason of common coupling of two adjacent external electrodes with a single positively charged spot internally of the tube. To minimize the undesirable coupling I have devised means for providing shielding between successive or adjacent external electrodes in an extremely simple and efficient manner. Specifically I coat the external face of the cathode ray tube with a metallic coating, for example, silver. I then remove from this coating small amounts thereof to outline the desired external electrodes, thereby creating collector electrodes in the form of metallic islands which are separated from the remaining metallic coating by small spaces in which the coating is absent. The metallic coating, exclusive of the electrodes, now forms a continuous surface, and may be grounded, forming effectively an electrostatic shield at ground potential between the various external electrodes.

It has been found that the use of a secondary electron collector electrode, such as is conventional in some types of cathode ray tubes, and which consists of a ring of conductive material coated internally of the tube at a considerable distance from the fluorescent screen, does not provide the most desirable type of electron collector, and that secondary electrons tend to pass not only to the collector electrode but to adjacent portions of the fluorescent screen, especially as the screen and the collector approach a common potential. The bound charges thus formed on the screen tend to transiently modulate or bend the beam of the cathode ray tube, introducing undesirable effects, especially in relation to time position modulated signals. I have, accordingly, and in accordance with a further embodiment of my invention utilized a collector electrode consisting of a thin coating of aluminum, which may be deposited on the fluorescent screen, over a thin layer of insulation. The primary electrons, which travel at high velocity, pass through the aluminum screen and impinge upon the fluorescent screen, the aluminum screen introducing substantially no impediment to the passage of electrons having high velocities. The secondary electrons, however, are at relatively low velocities, and the aluminum screen is not pervious to the lower velocity electrons, and serves as an efficient collector therefor. By collecting secondary electrons in this manner, the bound charges may be localized on the fluorescent screen with precise exactitude, and the operation of the system accordingly improved.

The true spirit and scope of my invention is defined in the appended claims in accordance with the requirements of the statutes relating to Letters Patent of the United States. A detailed description of various embodiments of my invention, together with the best means of utilizing the same of which I have knowledge, will be made evident upon consideration of the following detailed description, especially when taken in conjunction with the accompanying drawings, wherein:

Figure 1:
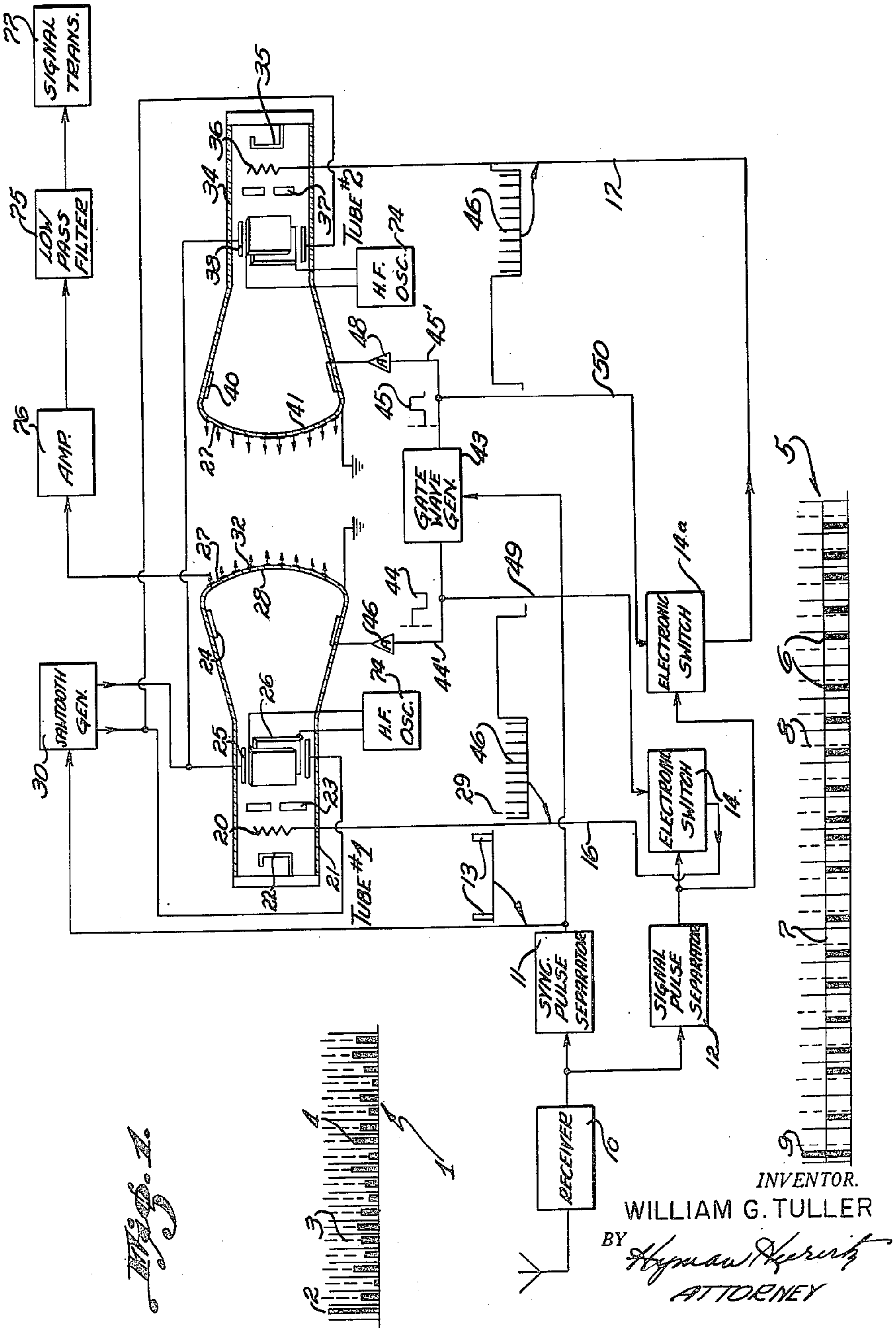
Figure 1 represents block diagram of the invention.

Referring now specifically to Figure 1 of the drawings, the reference numeral 1 represents a series of pulses, corresponding with a group of time divided signaling channels, of which the first, 2, is a synchronizing pulse having an amplitude greater than that represented by the dotted line 3, the latter representing the maximum amplitude of received amplitude modulated intelligence or information bearing pulses 4, and the total number of pulses 4 corresponding with the total number of information bearing channels in a group. Solely for the sake of example, in explaining the present invention I assume a total of twenty channels, of which the first is allocated to synchronization, there remaining nineteen intelligence or information bearing channels.

The reference numeral 5 represents generally a sequence of pulses 6 corresponding with the channels of a time division multiplex communication system, wherein the separate pulses 6 are of common amplitude 7, but are time position modulated with respect to median times 8 in the separate channels in accordance with information or intelligence, the pulse 9, however, representing a synchronizing pulse.

Figures 3, 4, 5, 6:
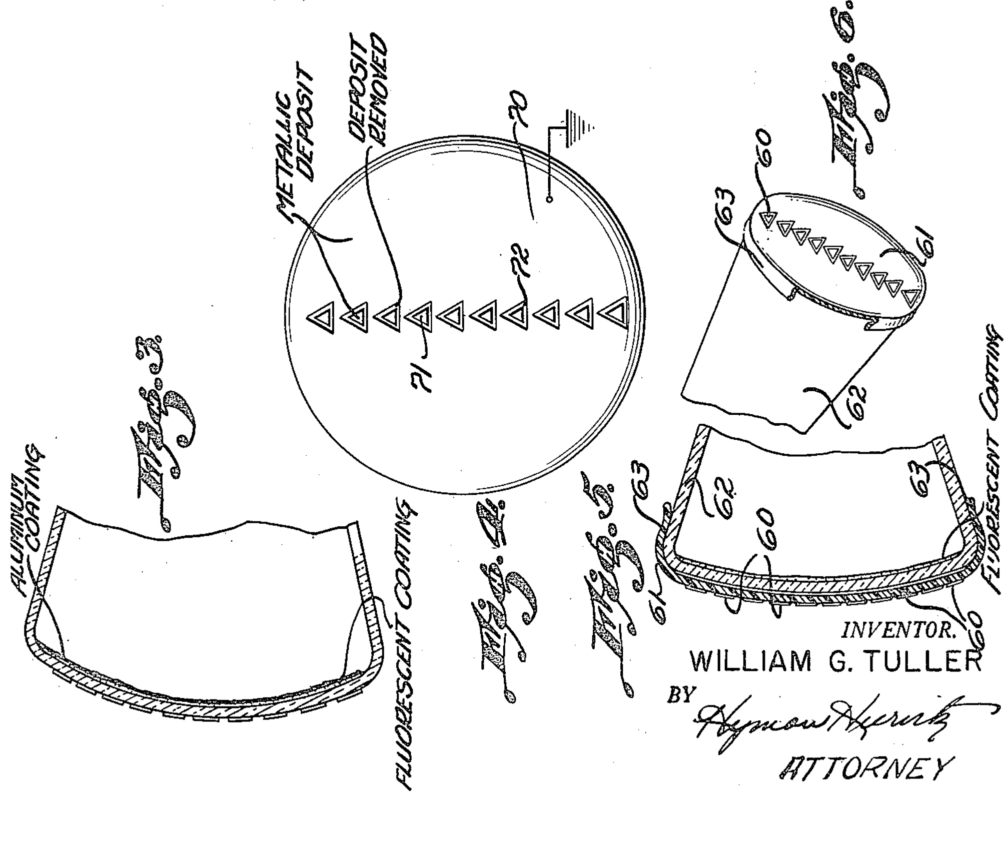
Figure 3 is a view in cross section taken through a cathode ray tube constructed in accordance with the present invention.
Figure 4 is a view in elevation of the external face of the cathode ray tube, which is coated with metallic material in accordance with my invention.
Figure 5 is a modification of the system of Figure 4 wherein the external electrodes are associated with the cathode ray tube in removable relation thereto.
Figure 6 is a view in perspective of the external face of a cathode ray tube indicator constructed in accordance with the embodiment of the invention illustrated in Figure 5 of the drawings.

As will become evident as the description proceeds, the present system, as illustrated in Figure 1 of the drawings, is capable of separating and demodulating trains of pulses of either the character of that illustrated in Figure 1 of the drawings, or of the character of that illustrated in Figure 5, that is either amplitude modulated pulses or time position modulated pulses, and the following description may accordingly be deemed to apply to pulses of either type, except as otherwise specifically stated.

Pulses are received in a receiver 10 and there demodulated and translated into D. C. pulses. The latter are applied in parallel to a synchronizing pulse separator 11, and a signal pulse separator 12. The synchronizing pulse separator 11 fails to respond to the signal pulses, by reason of their relatively small amplitude, but provides an output pulse 13 in response to each of the synchronizing pulses 4 or 9. The signal pulse separator on the other hand fails to respond to the synchronizing pulses 4 or 9, but passes only the signaling pulses 6 or 8, retaining the amplitude or the time positions of the pulses, respectively, without modification.

The signal pulses provided by the signal pulse separator 12 are applied in parallel to a two section electric switch, having sections 14 and 14a, the operation of which is synchronized in a manner to be described hereinafter, the operation of the electronic switch, considered as a whole, being such as to cause same to transfer input signals applied thereto over the lead 16 for half the time of each group of channels, and thereafter over the lead 17 for the remaining half the time, the switch-over being accomplished under control of the synchronizing pulses 13. Accordingly, upon reception of a synchronizing pulse 13 the switch section 14 is opened, section 14a remaining closed, and pulses 4 (or 6) are applied to the lead 16 for a period of one half the time of a group of channels, a total of nine channels being transferred. Thereafter the electronic switch section 14 is closed and the switch section 14a opened, the remaining ten pulses being transferred thereby over the lead 17. After completion of the passage of the tenth pulse over lead 17 a further synchronizing pulse 13 is received and the entire operation repeats.

The lead 16 is connected directly with an intensity control grid 20 of a cathode ray tube 21, the tube 21 having a cathode 22, an anode 23, the customary focusing electrodes (not shown) a collecting electrode 24, two pairs of mutually perpendicular deflecting electrodes 25 and 26, which serve to deflect the beam of the tube in mutually perpendicular directions, and, further, a face portion 27 coated internally with secondary electron emissive material 28, and which may comprise the usual fluorescent coating material applied to cathode ray tube indicators.

Figure 2:
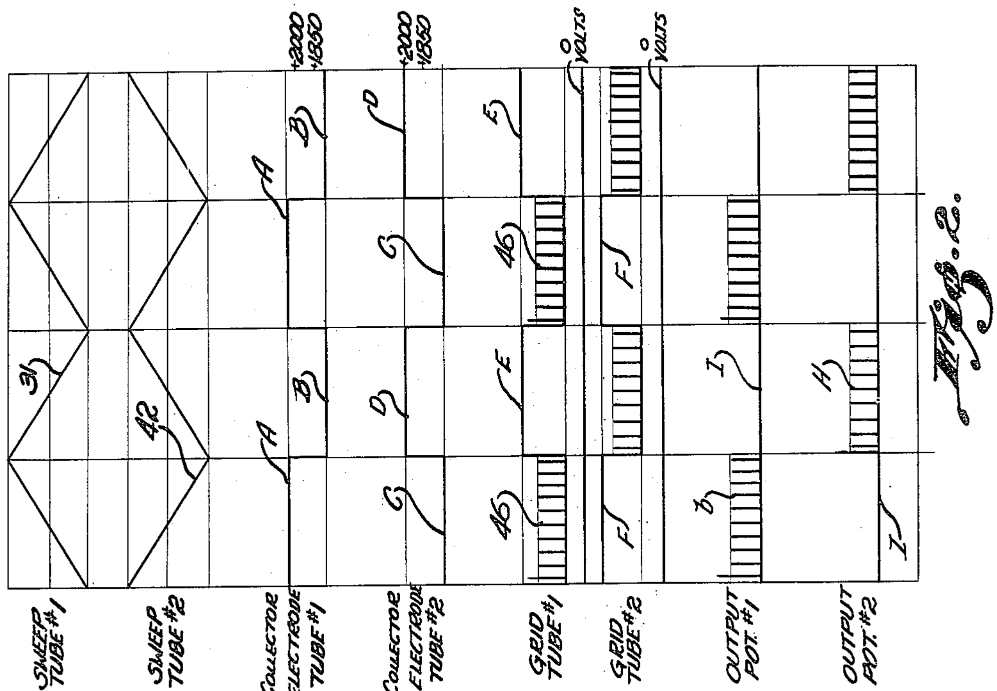
Figure 2 is a timing diagram illustrating variations and potential applied to the various electrodes of my commutator tube.

The sync pulse output 13 of the sync pulse separator 11 is applied to a saw-tooth generator 30 which generates a wave of the character of that identified in Figure 2 of the drawings by the reference numeral 31, and which is applied to the vertical deflection electrodes 25 for causing the electron beam of the tube to travel in a vertical path at uniform velocity, first in one direction, and then in the other, across the face of the tube. By proper adjustment of the various electrode voltages applied to the electrodes of the cathode ray tube indicator 21, the sweep of the beam may be so synchronized with the occurrence of the pulses in the various channels that signal representative pulses occur just as the beam traces over the position occupied externally of the tube by external electrodes 32.

Operating in conjunction with the tube 21 is a further and identical cathode ray tube 34 having a cathode 35, an intensity control grid 36, an anode 37, and appropriate focusing electrodes (not illustrated), two pairs of mutually perpendicular deflection electrodes 38 and 39, a collector electrode 40, and a highly secondary emissive screen 41, which may comprise fluorescent phosphor.

The output of the saw-tooth generator 30 is applied to the vertical deflection electrodes 38, but in opposed phase with respect to the voltages applied to the vertical deflection electrodes 25 of the cathode ray tube 21. Accordingly, as the cathode ray beam traces downwardly, in Figure 1, within the tube 21, the cathode ray beam of the tube 34 is tracing upwardly, the voltage applied to the cathode ray beam of the tube 34 being identified in Figure 2 of the drawings by the plot 42. The beams sweep alternately in opposite directions in the two tubes, one of the beams operating to impress on the screen 28 a record representing the pulses in the first nine channels of a group of channels, and thereafter, on its return trace, operating to erase the record, and the remaining tube 34 operating, while the beam of the tube 21 is effecting recording of pulse amplitudes on the screen 28, to erase a recording corresponding with the pulses in channels 11 to 20, inclusive, on the face 41 of the tube 34, the tubes 21 and 34 alternately recording the pulses present in various channels, and alternately erasing the traces, in phase opposition, or in alternation, and both tubes together serving to separate the 19 communication channels available in the present system.

Controlled from the sync pulse separator 11 is a gating wave generator 43, which, in response to each of the synchronizing pulses 13, generates a pair of square waves 44, 45, available on separate output leads 44 and 45, respectively, the waves 44, 45, available on the separate leads 44 and 45 being in opposite phase, and the wave 44 available on the lead 44 varying first positively and then negatively. The square wave 44 on the lead 44 is amplified by means of an amplifier 46 and applied to the colllector electrode 24 of the tube 21. The wave 45 available on the lead 45 is applied via an amplifier 48, as a wave having alternately less and more positive portions C and D, Figure 2, to the collector electrode 40.

Accordingly, the collector electrode 24 has impressed thereon a replica of the wave supplied by the gating wave generator 43, and is at a relatively high positive potential A during a recording trace and at a relatively low positive potential B during an erasing trace. Likewise the collector electrode 40 is subjected first to a relatively positive potential, C, during its erasing trace and thereafter to a relatively high positive potential, D, during a recording trace, the recording and erasing traces occurring at the tubes 21 and 34 alternately, or in alternation.

The square wave 44, likewise applied via a lead 49 to the electronic switch section 14, and the square wave 45 likewise is applied via a lead 50 to the electronic switch section 14a. Upon application to the electronic switch section 14 of the gating wave 44, via the lead 49, the electronic switch section 14 is rendered conductive to the signal pulses 4 or 6 provided by the signal pulse separator 12, during the positive portion of the gating wave 44, transferring these via the lead 16 to the intensity control grid 20. During the remaining portion of gating wave 44, however, the electronic switch 14 is cut off with respect to the pulse output of the signal pulse generator 12, and in its cut off position transfers to the control grid 20 of the cathode ray tube 21 a relatively high steady positive potential E (Figure 2) which is, in fact, of higher positive potential than any of the signal pulses 4 (or 6). Likewise the electronic switch section 14a is controlled by the gating wave 45 to transfer signals from the signal pulse generator 12, via the lead 51 to the intensity control grid 36 of cathode ray tube 34 while the gating wave 45 is in its positive phase, the gating wave 45 otherwise cutting off the electronic switch section 14a and applying to the control grid 36 a relatively high positive potential, F, Figure 2, higher than the potential of any of the signal pulses 4 (or 6). Accordingly, the electronic switch sections 14 and 14*a* operate in alternation to apply to the respective cathode ray tube indicators 21 and 34, the first nine communication channels and the last ten communication channels, respectively.

In the absence of control or information bearing signal pulses, and during a signal recording trace, the beam of the cathode ray tube may be biassed to cut off, the signal pulses serving to turn the electron beam on, and in the retrace or erasing portion of the scan at each of the tubes, the control grids 20 and 36 are rendered more positive than the highest positive potential available in any signal pulse.

Reviewing now the operation of the apparatus of the present system, signal pulses in twenty successive time divided channels are received by the receiver 10, the nineteen signal pulses 4 or 6 following a first synchronizing pulse 2 (or 9), which has an amplitude greater than any of the communication pulses 4 or 6. The synchronizing pulses 2 or 9 separated from the output of the receiver 10 by sync pulse separator 11, the output of which is applied to a gating wave generator 43, causing the latter to generate two gating waves, 44 and 45, of opposite phase, these gating waves extending for the duration of a group of channels and each consisting of an alternately positive and a negative portion, which are of equal durations. The gating waves 44 and 45 provided by the gating wave generator 43 are applied to a pair of electronic switch sections 14 and 14*a*, to the input of which are applied in parallel the signal pulses 4 or 6, separated from the group of channels by the signal pulse separator 12. The electronic switch section 14 is rendered operative to transfer signal pulses in positive sense against a steady normal bias during the positive portion of the gating wave 44, and is rendered inoperative to pass sign signals during the negative portion of the gating wave 44. Likewise the electronic switch 14*a* is rendered operative to pass the communication signals in positive sense against a steady normal bias while the gating wave 45 applied thereto is positive, and is cut off when the gating wave 45 applied thereto is negative. The output of the electronic switch 14 comprises, then, the first nine intelligence bearing channels, in a 20 channel system, the first channel being allocated to synchronizing, and during the remaining ten channels, the electronic switch 14 is cut off, and in its cut-off condition applies to the control grid 20 of the cathode ray tube 21 a high intensifying bias E.

The electronic switch 14*a* is in signal passing condition, in response only to the positive portion of the control wave 45, and accordingly fails to pass any of the first ten channels applied thereto, but passes only the remaining ten, and during its cut-off condition or while the first ten channels are in existence, the potential applied to the control grid 36 of the cathode ray tube 34 is intensified, or of a relatively great positive value F. For purposes which will appear as the explanation proceeds the intensifying steady voltages E and F applied to the control grids 20 and 36 have a greater magnitude than any of the pulse signals contained in the communication channels.

The sync signal separator 11 supplies synchronizing pulses 13 to a saw-tooth generator 30, which generates a saw-tooth voltage having a period equal to the group frequency, the sweeps commencing at a predetermined negative value, passing through zero, and extending to a predetermined positive value, and then reversing by passing to the initial negative value co-linearly in the same period of time as was required for passage from negative to positive. The sweep voltages are applied to the vertical deflection electrodes 25 and 38 of the cathode ray tubes 21 and 34, in opposite relative phase, and accordingly, the beams of the cathode ray tubes sweep, in equal time periods, linearly across the screen, first in one direction and then in the other, but in opposite directions in the tubes 21 and 34, at any given time.

Cemented or otherwise secured to or adjacent each of the external faces of the cathode ray tube indicators 21 and 34, is a plurality of electrodes 27 which may be equally spaced along the face of each tube in a straight line which intersects the plane of motion of the beam of the tube.

Considering first the tube 21, the synchronizing pulse arrives and commences operation of the saw-tooth generator 30, and also effects generation of a positive square wave by the gating wave generator 43, the latter being applied by the amplifier 46 to the accelerator or collector electrode 24, raising the potential of the latter. At the same time the gating wave provided by the gating wave generator 44 applies a signal to the electronic switch section 14 which permits passage to the control grid 20 of the tube 21 of signals 4 or 6 provided by the receiver 10.

The beam of the cathode ray tube 21 is then swept across the face of the tube 21, internally thereof, and as the beam passes over the positions occupied by the output electrodes 27 signals occur, which intensify the beam. Upon each intensification of the beam the electrons of the beam impinge on the fluorescent screen 28, causing emission of secondary electrons which are attracted to and collected by the collector electrode 24, now at a high positive potential A. The release of secondary electrons by the fluorescent screen 28 effects a variation of potential at the point of release, which is communicated externally of the tube as a displacement current in the glass envelope, which in turn modifies the potential of an external electrode 27.

The plot of the potentials developed on the screens of the tubes 21 and 34 is provided at G and H of Figure 2, the level I corresponding with the average potential of the screens of the tubes in the absence of signal pulses, or to the potentials A, D of the collector electrodes 24, 40.

After completion of a signal recording trace in the tube 21, signal pulses are cut off by the switch section 14, which applies a steady high positive bias E to the intensity control electrode 20, in place of the signals 4 or 6, the magnitude of the bias voltage E being greater than the magnitude of any signal pulse.

Simultaneously the sweep voltage 31 reverses and the electron beam commences its reverse or erasing sweep, and the potential applied to the collector electrode 24 is reduced to a value B. The value B corresponds approximately with the mean potential of the screen 28, as will appear, and accordingly secondary electrons emitted by the screen 28 in response to impact thereagainst of the intensified electron beam during the erasing sweeps are not attracted thereto, initially, the screen 28 retaining electrons impinging thereon at those portions of the screen 28 which are at higher potential than is the collector electrode 24. As any portion of the screen tends to become of lower potential than the collector electrode 24 secondary electrons are emitted and collected by the collector electrode 24, so that the potential of each element of area of the screen 28 which is scanned by the beam ultimately assumes a potential approximately equal to that of the collector electrode. The original record of the signals 4, 6, is now, accordingly, erased.

Upon a succeeding signal recording trace, the potential of the collector electrode is raised to the value A, the bias on the control electrode 20 is reduced to a value adaquate to cut off the beam of the tube 21 in the absence of signal pulses, and the signal pulses 4 or 6 are again applied to the intensity control electrode 20, in positive relation, as the beam sweeps across the face 28 of the tube 21, internally thereof. In response to each signal pulse, 4 or 6, the beam of the tube 21 impinges on the screen 28, effecting emission of secondary electrons, until the affected surface element of the screen 28 assumes a positive charge equal to the potential D of the collector electrode 24. At this point the surface element has acquired its maximum positive potential, since further secondary electrons which might be emitted return to the surface element.

Should the signal pulses 4, 6 be amplitude modulated, the maximum potential attainable by the surface elements of the screen 28, which are charged positively by secondary emission of electrons therefrom, may never be reached, and the actual potential attained in response to each applied pulse will be then a measure of the magnitude of the pulse.

It should further be recognized that in the interim between pulses, during the recording trace, it is not essential that the beam of the tube be cut off, so long as it is operated at reduced intensity. In the latter case secondary emission may take place over the entire path scanned by the beam of the tube, but at relatively low intensity between signal pulses.

Upon completion of a signal recording cycle in the tube 21, a further signal recording cycle is initiated in the tube 34, which proceeds in all respects similarly to the corresponding cycle in tube 21, the tubes 21 and 34 operating, however, in alternation, one recording the ten channels while the other erases in preparation for a recording operation, and the other recording ten channels while the one erases the channels previously recorded.

Both tubes, 21 and 34, operating together, accomplish channel separation without loss of signals, despite the fact that either of the tubes, considered separately, is operative only for channel separation for 50% of its total operating time.

While I have found that the collector electrodes may be separated by substantial distances from the external face of the cathode ray tube, without seriously impairing the operation of the present system, it is usually advantageous to impress the external output electrodes directly against or on the glass envelope of the cathode ray tube. The fact that substantial pick-up may be obtained with considerable separation between the output electrodes and the surface of the tube is taken advantage of in the system illustrated in Figures 5 and 6 of the drawings, wherein the electrodes 60 are cemented or otherwise secured to a plastic mask 61, which is separable from the tube 62, and which may be attached thereto by virtue of the resilient rim 63 forming part of the mask, or attached to the mask, and which is shaped to fit snugly over the body of the tube for a short distance.

A problem is presented of electrically mutually isolating or shielding external output electrodes secured to the face of a cathode ray tube, so that voltage variations present on one of the electrodes will not be communicated to others of the electrodes. This may very effectively be accomplish by means of an electrode system such as is illustrated particularly in Figures 3 and 4 of the drawings. In the system of Figures 3 and 4 the external face of a cathode ray tube is coated over its entire surface with a metallic deposit 70, which may be, for example, silver. The silver is then removed, as by a scraping process, to outline the required electrodes 71, which are then each surrounded by a small space 72 devoid of metallic coating, the space 72 being itself surrounded by the remainder of the coating 70. The latter may be grounded, and of itself provides an extremely effective shield for the electrodes.

Obviously, in the system of Figures 5 and 6, if desired, the electrodes may be formed and shielded in accordance with the teaching of the previous paragraph.

In utilizing the present system for the separation of time divided signal channels containing time position modulated signals, the electrodes may be of irregular shape, for example triangular, and having a variation of width in the direction of scan of the electron beam of the cathode ray tube involved, the electrodes then effecting simultaneously detection and channel separation.

Referring now to Figure 4 of the drawings, the output electrodes 71 may be seen to be of generally triangular shape, the apices of the triangles being vertically directed, when employed in conjunction with a vertical scan. We may assume that the electrode system of Figure 4 is utilized in the system illustrated in Figure 1 of the drawings. Referring to the latter figure, there is applied to the horizontal deflection electrodes 26 of cathode ray tube 21 signal from a source of high frequency oscillations 74, say at a frequency of 30 mc. The amplitude of the oscillations is selected to be sufficient to cause the beam to sweep rapidly, at the frequency of 30 mc., laterally across the electrodes 71, during the slow vertical scan, which may occur at a rate of perhaps 50,000 per second. Since the time of occurrence of a pulse in a time position modulated signal channel determines the vertical portion of each electrode 71 which will be scanned over laterally during the pulse, in response to the high frequency scanning voltage provided by the source 74, each time position modulated pulse will be translated by the system into a plurality of duration modulated pulses, which, while they persist, will have a repetition rate equal to twice the frequency of the source 74, and each a duration equal to the time required for a lateral scan across an electrode 71, at the scanning position.

Pulses of such character may be applied as input signal to a low pass filter 75, after amplification in an amplifier 76, the filter 75 removing from the signal all Fourier components deriving from the shape and repetition rate of the pulses, and groups of pulses, and passing Fourier components corresponding with the average energy in the pulses. For an adequate communication channel then the cut-off frequency of the filter 75 may be of the order of 5 kc. or less, and its output may be then applied directly to a translating device 77, such as a loud speaker, telegraph recorder, facsimile recorder, or the like.

The lateral beam sweep above described as applied to the beam of cathode ray tube 21, may likewise be applied to the beam of cathode ray tube 34, to accomplish simultaneous detection and channel separation thereby.

It is found that detection of time position modulated pulses may be accomplished without lateral sweep, by properly adjusting the focusing of the beams of the cathode ray tubes to establish beams of considerable cross sectional area, and utilizing triangularly shaped external pick-up electrodes. Such operation is made possible by the fact that the total voltage induced in an electrode 71 is a function of the area of the electrode which coincides with a charged portion of the fluorescent screen, which is in turn, a function of the time position of the signal pulse which generates the charged portion. If, for example, a signal pulse occurs as the beam of the tube 21 reaches the apex of a triangular electrode 71, substantially no signal output will be available at the electrode. If, on the other hand, the pulse occurs as the beam reaches the base of an electrode 71 the output signal will be a maximum. The beam, in operation of this character, should be de-focused to have a cross-sectional diameter equal to the width of the base of the electrodes 71.

For detection of amplitude modulated pulses, the shape of the output electrodes is, of course, relatively immaterial.

Reference is made to Figure 3 of the drawings, wherein is illustrated a modification of the cathode ray tubes employed in that system. Specifically, for the secondary electron collector electrode 24 may be substituted a metallic coating, 75, deposited on the fluorescent screen 28, over a thin layer of insulation. The metal itself may be aluminum, or other light metal which is pervious to high speed electrons, and may be deposited in any known manner. High speed electrons in the electron beam of the tube 21 pass through the metallic coating and the insulating coating thereunder, and impinge on the fluorescent screen 28, without substantial loss of energy. Secondary electrons, however, which have relatively low velocities, pass through the insulating coating but are collected by the metallic coating 75. The coating 75 forms an equipotential conducting surface at extremely slight distance from the screen 28, and attracts and collects all secondary electrons emitted by the screen 28, because of its proximity thereto.

In the system of Figure 1, wherein the tube 21 is provided with an annular collector electrode 24, as spots on the screen 28 lose charge in response to signals, and approach the potential of collector electrode 24, the secondaries tend to be attracted by the adjacent relatively positive portions of the screen, which have not lost electrons in response to signals. This action distorts the signal pattern otherwise recorded on the fluorescent screen, since if secondary electrons are deposited ahead of the electron beam during a signal recorded sweep they will repel the beam and introduce non-linearity into the sweep or scan of the beam. This is particularly disadvantageous in separating and detecting time position modulated pulses.

The application of the present system to the separation of time division multiplex channels, the signals in the separate channels being of any desired character, will be appreciated from the above discussion. The commutator tube of the present invention is, however, utilizable wherever commutator tubes have been utilized heretofore, and the use of the tubes is not intended to be limited, moreover, to communication system, since they may find obvious application wherever electronic commutation is to be accomplished.

While I have described various specific embodiments of my invention it will be clear that variations of the combination disclosed and of the details thereof may be resorted to without departing from the true scope of the invention.

What I claim and desire to secure by Letters Patent of the United States is:

1. A commutator tube comprising means for generating a beam of electrons, a continuous secondary electron emissive coating of high resistivity material located in the path of said beam of electrons, means for scanning said beam of electrons across said secondary electron emissive surface, means for modulating the intensity of said beam of electrons, and a plurality of collector electrodes each electrically conductively insulated from said secondary electron emissive surface and in electro-statically coupled relation therewith.

2. A commutator tube comprising a tube envelope, means in said envelope for generating a directed beam of electrons, means for deflecting said beam of electrons, secondary emissive high resistivity material coated on an interior face of said envelope and receiving said directed beam of electrons, and a plurality of mutually insulated means located exteriorly of said envelope and insulated from said material for detecting changes of potential of said secondary emissive material due to emission of secondary electrons.

3. A commutator tube system comprising a tube envelope, means in said envelope for generating a directed beam of electrons, secondary electron emissive high resistivity material coated on an interior face of said envelope, means for causing said beam of electrons to scan across said interior face of said envelope, means for modulating the intensity of said beam of electrons during said scan to effect variations of secondary electron emission from said material, means for collecting secondary electrons emitted from said materials, a plurality of electrodes located exteriorly of said envelope adjacent to said interior face of said envelope and insulated from said material, and means for abstracting from each of said electrodes signals corresponding with said variations of secondary electron emissive material, said material substantially retaining electric charges effected thereon by secondary electron emission during said scan.

4. A commutator tube system comprising a tube envelope, means in said envelope for generating a directed beam of electrons of predetermined intensity, secondary electron emissive material coated on an interior face of said envelope, means for causing said beam of electrons to move in two successive scans across said interior face of said tube envelope, means for modulating said predetermined intensity of said directed beam of electrons during a first of said two scans to effect variations of secondary electron emission from said secondary electron emissive material, a plurality of electrodes located exteriorly of said envelope adjacent to said interior face of said envelope and responsive to said variations of said secondary electron emission, means for collecting said secondary electrons comprising a collector electrode located interiorly of said tube envelope, means for maintaining said collector electrode at a first potential during said first of said two scans of said beam of electrons, means for maintaining said beam of electrons at substantially constant intensity during a second of said two successive scans, and means for reducing said first potential of said collector electrode during said second of said two successive scans.

5. A commutator tube system comprising a tube envelope, means in said envelope for generating a directed beam of electrons of predetermined intensity, secondary electron emissive material coated on an interior face of said envelope, means for causing said beam of electrons to scan across said interior face of said tube envelope in two successive scans, means for modulating said predetermined intensity of said directed beam of electrons during a first of said two scans to effect successive variations of secondary electron emission from said secondary electron emissive material, a plurality of collector electrodes located exteriorly of said envelope adjacent to said interior face of said envelope and positioned to be responsive to said variations of secondary electron emission, a collector electrode for collecting said secondary electrons, means for maintaining said collector electrode at a first predetermined potential during said first of two scans of said beam of electrons, means for maintaining said beam of electrons at substantially constant intensity during a second of said two successive scans, said last mentioned intensity being greater than said predetermined intensity, and means for reducing said first potential of said collector electrodes during said second of said two succesive scans.

6. A commutator tube system comprising a tube envelope, means in said envelope for generating a directed beam of electrons of predetermined normal intensity, secondary electron emissive material coated on an interior face of said envelope, means for causing said beam of electron to scan across said interior face of said tube envelope in two successive scans, means for modulating said predetermined intensity of said directed beam of electron during a first of said two scans to effect variation of secondary electron emission from said secondary electron emissive material, the maximum intensity of said directed beam of electron during said first of said two scans being less than a second predetermined intensity, a plurality of electrodes located exteriorly of said envelope adjacent to said interior face of said envelope and responsive to said variation of said secondary electron emission, means for collecting said secondary electrons comprising a collector electrode located interiorly of said tube envelope, means for maintaining said collector electrode at a first potential during said first of said two scans of said beam of electrons, said first potential being arranged to accomplish collection by said collector electrodes of all secondary electrons emitted from said secondary electron emissive material, means for maintaining said beam of electron at a substantially constant intensity during a second of said two successive scans, said substantially constant intensity being greater than said second predetermined intensity, and means for reducing said first potential of said collector electrode during said second of said two successive scans to a potential less than the minimum potential established on said secondary electron emissive material by virtue of secondary electron emission therefrom during said first scan.

7. A commutator tube comprising an envelope having a vitreous wall portion, said envelope comprising means interiorly thereof for generating a beam of electrons, a secondary electron emissive coating secured to said vitreous wall portion interiorly of said envelope, means for establishing a common electric potential over a predetermined area of said coating, means for directing said beam of electrons against said area, means for scanning said beam of electrons over said predetermined area of said secondary electron emissive coating, means responsive to a time pattern of signals for modulating the intensity of said beam of electrons during said scanning for accomplishing secondary electron emission from said predetermined area of said secondary electron emissive coating in a pattern corresponding with said time pattern of said signals, means having a potential greater than said common electric potential for collecting said secondary electrons, and means operable thereafter for re-establishing said common electric potential over said predetermined area of said coating.

8. A commutator tube comprising an envelope having a vitreous wall portion, said envelope comprising means interiorly thereof for generating a beam of electrons, a secondary electron emissive coating secured to said vitreous wall portion interiorly of said envelope, means for establishing a common electric potential over a predetermined area of said coating, means for directing said beam of electrons against said coating, means for scanning said beam of electrons over said predetermined area of said secondary electron emissive coating, means responsive to a time pattern of signals having a predetermined maximum amplitude for modulating the intensity of said beam of electrons during said scanning for accomplishing secondary electron emission from said predetermined area of said secondary electron emissive coating in a pattern corresponding with said time pattern of said signals, means having a potential greater than said common electric potential for collecting said secondary electrons, and means for re-establishing said common electric potential over said predetermined area of said coating, said last named means comprising means for raising the intensity of said beam of electrons above said predetermined maximum amplitude of said signals, and for simultaneously lowering the potential of said means for collecting said secondary electrons to a value substantially equal to the potential of said predetermined area of said secondary electron emissive coating, and means for effecting a scanning of said coating by said electron beam in the absence of signals.

9. A commutator tube comprising an envelope having a vitreous wall portion, said envelope comprising means interiorly thereof for generating a beam of electrons, a secondary electron emissive highly resistive coating secured to said vitreous wall portion interiorly of said envelope, means for directing said beam of electrons against said coating, means for scanning said beam of electrons over said electron emissive coating, signal responsive means for modulating the intensity of said beam of electrons during said scanning, and means for collecting secondary electrons emitted by said electron emissive coating whereby to record on said coating in terms of electric charges the character of said signals, an insulating plate detachably secured to said vitreous wall portion of said envelope exteriorly thereof, and a plurality of electrodes secured to said insulating member in electro-statically coupled relation with said electron emissive coating.

10. A cathode ray tube commutator comprising a vitreous envelope having a face internally thereof coated with secondary electron emissive highly resistive material, means in said envelope for generating a beam of electrons and for directing said beam of electrons against said material, means for recurrently deflecting said beam in a plane intersecting said face, a plurality of collector electrodes adjacent said face externally of said vitreous envelope and located substantially adjacent to said plane, and signal responsive means for intensity modulating said beam of electrons.

11. A time division multiplex channel separator comprising a source of recurrent groups of time divided multiplex channels, a cathode ray commutator tube comprising a vitreous envelope having a face interiorly thereof coated with secondary electron emissive highly resistive material, means in said envelope for generating a beam of electrons and for directing said beam of electrons against said secondary electron emissive material, a plurality of electrically conductive collector electrodes located adjacent said face exteriorly of said vitreous envelope, means for deflecting said beam of electrons recurrently in a plane intersecting said plurality of collector electrodes and in synchronism with the occurrence of said recurrent groups of time divided multiplex channels, the number of said multiplex channels within a group of channels corresponding with the number of said collector electrodes.

12. A commutator tube comprising means for generating a beam of electrons, a secondary electron emissive highly resistive surface, means for scanning said beam of electrons across said secondary electron emissive surface, means for modulating the intensity of said beam of electrons, and a plurality of collector electrodes each electrically conductively insulated from said secondary electron emissive surface in electrostatically coupled relation therewith, each of said collector electrodes comprising a conductive coating on an exterior wall of said commutator tube.

13. A commutator tube comprising a tube envelope, means for generating a beam of electrons in said envelope, secondary electron emissive highly resistive material coated on an interior face of said envelope, means for guiding said beam of electrons to impinge on said secondary electron emissive material, and at least one electrode located exteriorly of said envelope and in electro-statically coupled relation with said secondary electron emissive material, said at least one electrode comprising a metallic deposit applied directly to an exterior surface of said tube envelope.

14. A commutator tube comprising a tube envelope, means in said envelope for generating a directed beam of electrons, means for deflecting said beam of electrons, secondary electron emissive highly resistive material coated on an interior face of said envelope for receiving said directed beam of electrons, and means located exteriorly of said envelope for detecting changes of potential of said secondary emissive material during reception thereby of said directed beam of electrons, said means comprising a plurality of electrodes each of said electrodes comprising a conductive deposit applied directly to an exterior surface of said tube envelope.

15. A time division multiplex channel separator comprising a source of recurrent groups of time divided multiplex channels, a cathode ray commutator comprising a vitreous envelope having a face interiorly thereof coated with secondary electron emissive highly resistive material, means in said envelope for generating a beam of electrons and for directing said beam of electrons against said secondary electron emissive material, a plurality of electrically conductive collector electrodes located adjacent said face exteriorly of said vitreous envelope, means for deflecting said beam of electrons recurrently in a plane intersecting said plurality of collector electrodes and in synchronism with occurrence of said recurrent groups of time divided multiplex channels, the number of said multiplex channels within a group of channels corresponding with the number of said collector electrodes.

16. A time division multiplex channel separator comprising a source of recurrent groups of time divided multiplex channels, a pair of cathode ray tube commutators each comprising a vitreous envelope having a face interiorly thereof coated with secondary electron emissive highly resistive material, means in each of said envelopes for generating a beam of electrons and for directing said beam of electrons against said secondary electron emissive material, a plurality of electrically conductive collector electrodes located adjacent a face of each of said commutators exteriorly of the vitreous envelope thereof, means for deflecting each of said beams of electrons recurrently in a plane intersecting a plurality of associated collector electrodes, means for applying a portion of said channels to one of said commutators for separation thereby, means for applying the remainder of said channels to the other of said commutators for separation thereby, and means for synchronizing the operation of said means for deflecting in said separate commutators with the application of channels thereto.

17. A commutator tube comprising an envelope having vitreous wall portions, means in said envelope for generating a beam of electrons, a secondary electron emissive highly resistive coating secured to a vitreous wall portion of said envelope, means for directing said beam against said coating, a secondary electron collector electrode comprising a metallic coating secured to said secondary electron emissive coating, and output electrodes located exteriorly of said envelope and in electro-statically coupled relation to said secondary electron emissive coating.

18. A commutator tube comprising an envelope having a vitreous wall portion, said envelope comprising means interiorly thereof for generating a beam of electrons, a continuous secondary electron emissive coating secured to said vitreous wall portion interiorly of said envelope, means for directing said beam of electrons against said coating, means for scanning said beam of electrons over said electron emissive coating, signal responsive means for modulating the intensity of said beam of electrons during said scanning, and means for collecting secondary electrons emitted by said electron emissive coating during said scanning whereby to record on said coating in terms of electric charges the character of said signals, and a plurality of mutually insulated electrodes located exteriorly of said envelope for translating said electric charges into voltages representative of said first mentioned signal.

19. A commutator tube comprising an envelope having a vitreous wall portion, said envelope comprising means interiorly thereof for generating a beam of electrons, a secondary electron emissive highly resistive coating secured to said vitreous wall portion interiorly of said envelope, means for establishing a common electric potential over a predetermined area of said coating, means for directing said beam of electrons against said coating, means for scanning said beam of electrons over said predetermined area of said secondary electron emissive coating, means responsive to a time pattern of signals for modulating the intensity of said beam of electrons during said scanning for accomplishing secondary electron emission from said predetermined area of said secondary electron emissive coating in a pattern corresponding with said time pattern of said signals, and means having a potential greater than said common electric potential for collecting said secondary electrons.

20. In a time division multiplex communication system, a channel separator comprising an electronic commutator tube having means interiorly thereof for generating a beam of electrons, a plurality of signal pick-up electrodes located in a predetermined configuration exteriorly of said commutator tube and adjacent a face thereof, means for periodically sweeping said beam of electrons across said face at a first repetition rate and in a path proximate to said pick-up electrodes, a source of a plurality of time divided multiplex communication channels having time position modulated signals in each of said channels, means for applying said signals to intensity modulate said beam of electrons in synchronism with the scanning of said beam of electrons, said pick-up electrodes having each a plurality of different dimensions laterally of said path at a corresponding plurality of points along said path, and means for periodically moving said beam of electrons transversely of said path at a rate greater than said first repetition rate.

21. A system for demodulating a time position modulated pulse comprising, means for generating a beam of electrons, a collector electrode of generally triangular outline, means for sweeping said beam of electrons across said collector electrode, between a base and an apex thereof, and means for intensity modulating said beam of electrons in response to said time position modulated pulse during said sweep of said beam of electrons across said electrode, whereby a point of contact between said beam of electrons and said electrode corresponds with the time position of said pulse.

22. A system for demodulating a time position modulated pulse comprising, means for generating a beam of electrons, a collector electrode of generally triangular outline, means for sweeping said beam of electrons in a path across said collector electrode between a base and an apex thereof, means for intensity modulating said beam of electrons in response to said time position modulated pulse during said sweep of said beam of electrons across said electrode, and means for periodically scanning said beam of electrons transversely of said path during traverse of said beam of electrons in said path to generate at least one duration modulated pulse in said electrode in response to said time position modulated pulse having a duration corresponding with the time position of said time position modulated pulse.

WILLIAM G. TULLER.

REFERENCES CITED

The following references are of record in the file of this patent:

UNITED STATES PATENTS

| Number | Name | Date |
|---|---|---|
| 1,929,067 | Hund | Oct. 3, 1933 |
| 2,036,350 | Montani | Apr. 7, 1936 |
| 2,097,392 | Finch | Oct. 26, 1937 |
| 2,122,102 | Lundell | June 28, 1938 |
| 2,142,541 | Vogel | Jan. 3, 1939 |
| 2,185,693 | Mertz | Jan. 2, 1940 |
| 2,241,809 | DeForest | May 13, 1941 |
| 2,257,795 | Gray | Oct. 7, 1941 |
| 2,277,192 | Wilson | Mar. 24, 1942 |
| 2,301,743 | Nagy et al. | Nov. 10, 1942 |
| 2,301,748 | Renshaw | Nov. 10, 1942 |
| 2,365,476 | Knoop, Jr., et al. | Dec. 19, 1944 |
| 2,490,833 | Ransom | Dec. 13, 1949 |
| 2,513,947 | Levy | July 4, 1950 |